(No Model.) 4 Sheets—Sheet 1.

R. CLAY.
NUT LOCK.

No. 386,381. Patented July 17, 1888.

Witnesses,
Percy B Hills
Robert Everett

Inventor:
Richard Clay
By James L. Norris
Atty.

(No Model.)  4 Sheets—Sheet 2.

R. CLAY.
NUT LOCK.

No. 386,381.  Patented July 17, 1888.

Witnesses:
Percy B. Hills
Robert Sowett

Inventor
Richard Clay.
By James L. Norris.
Atty.

(No Model.) 4 Sheets—Sheet 3.

R. CLAY.
NUT LOCK.

No. 386,381. Patented July 17, 1888.

Witnesses,
Percy B Hills.
Robt Everett,

Inventor,
Richard Clay.
By
James L. Norris.
Atty.

(No Model.) 4 Sheets—Sheet 4.

R. CLAY.
NUT LOCK.

No. 386,381. Patented July 17, 1888.

Witnesses.
Percy B. Hills.
Robt. Everett.

Inventor.
Richard Clay,
By James L. Norris.
Atty.

N. PETERS. Photo-Lithographer. Washington, D. C.

United States Patent Office.

RICHARD CLAY, OF LONDON, ENGLAND.

NUT-LOCK.

SPECIFICATION forming part of Letters Patent No. 386,381, dated July 17, 1888.

Application filed February 27, 1888. Serial No. 265,399. (No model.) Patented in England January 16, 1888, No. 671.

*To all whom it may concern:*

Be it known that I, RICHARD CLAY, of the city of London, England, a subject of the Queen of Great Britain, have invented certain new and useful Improvements in Lock-Nuts, (for which I have made application for Letters Patent in Great Britain, No. 671, dated January 16, 1888,) of which the following is a specification.

My improvements in lock-nuts consist in forming them of portions of a longitudinally-divided tube (hereinafter termed "gripping-pieces") and a tubular collar, (hereinafter termed the "binding-collar,") which fits over and surrounds the gripping-pieces, and is engaged therewith by suitable means and binds the said gripping-pieces on the screw or rod or shaft or spindle to which the lock-nut is to be applied. The inner faces of the gripping-pieces have portions of a screw-thread formed on them, or other provision is made for the engagement of the said gripping-pieces with the said screw or rod or shaft or spindle.

I will further describe my invention with reference to the accompanying drawings and to the letters and figures marked thereon.

The same letters and figures of reference indicate the same or corresponding parts in each of the figures of the drawings.

Figure 2:
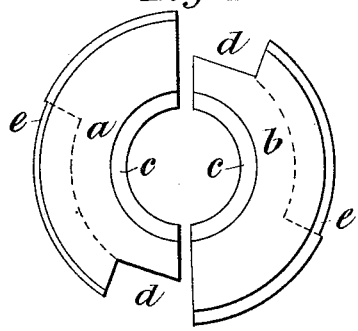
Figure 6:
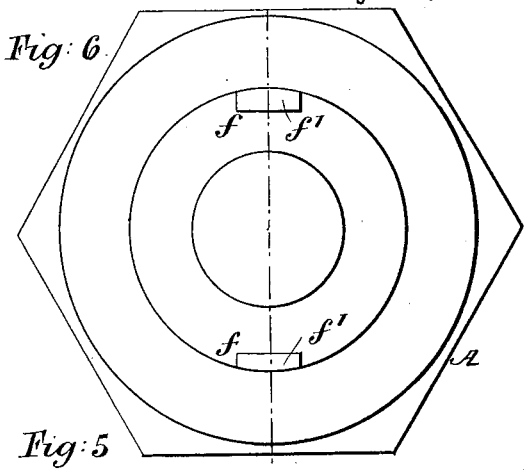
Figure 1:
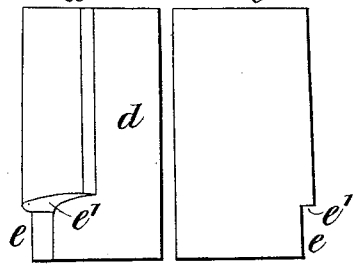
Figure 5:
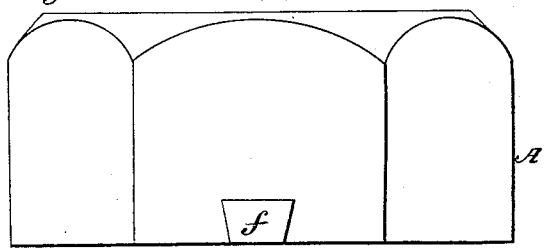
Figure 3:
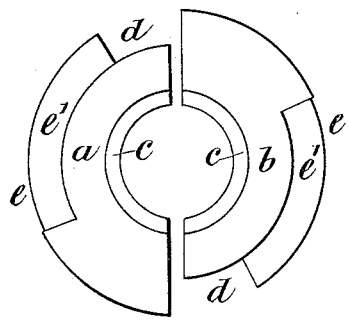
Figure 7:
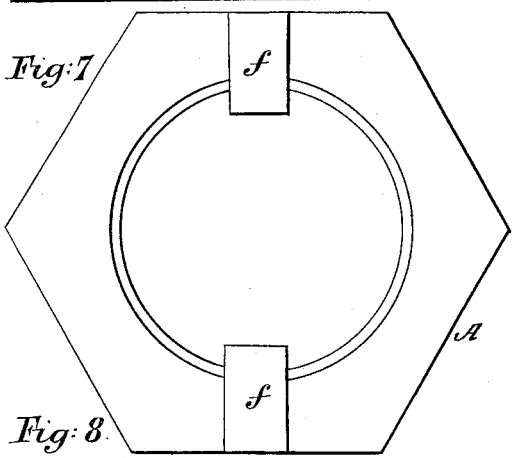
Figure 4:
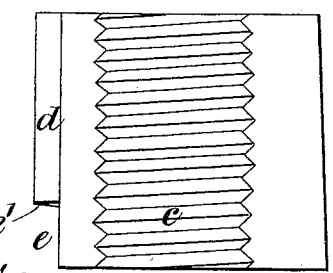
Figure 8:
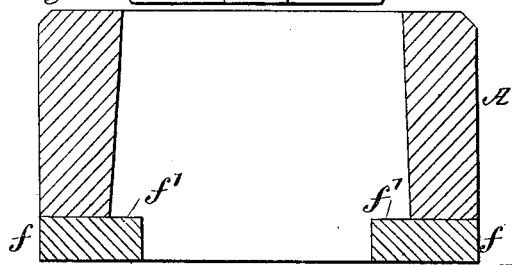
Figure 11:
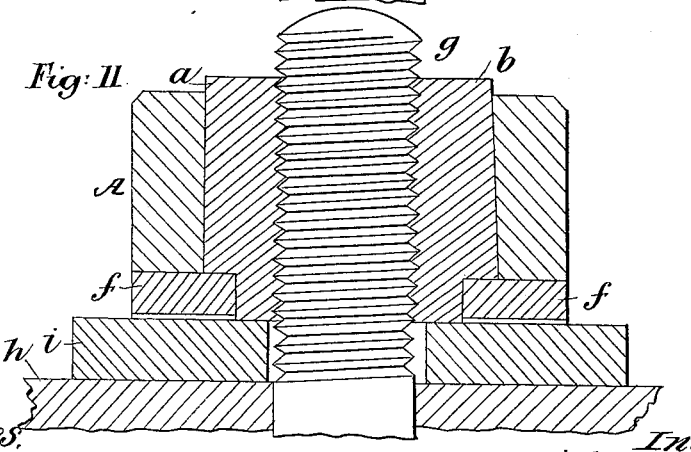
Figure 12:
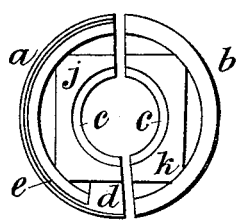
Figure 15:
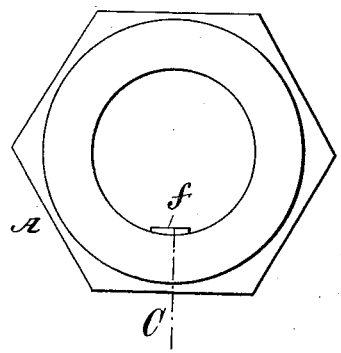
Figure 13:
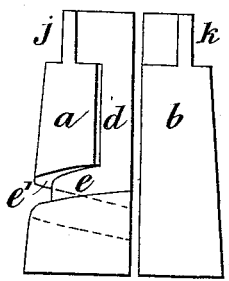
Figure 16:
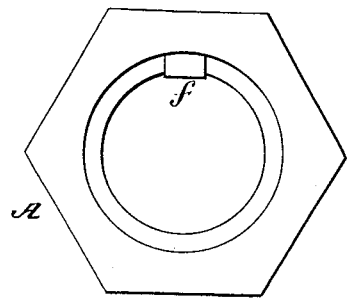
Figure 14:
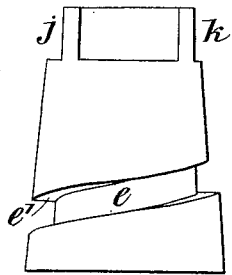
Figure 17:
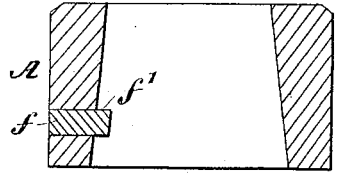
Figure 18:
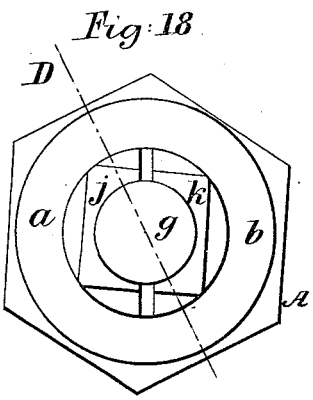
Figure 19:
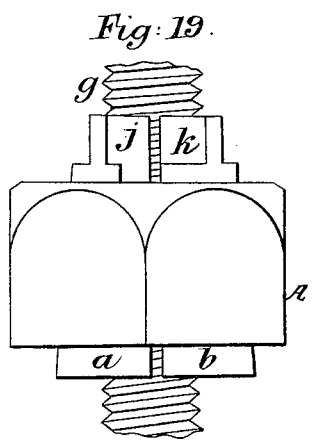
Figure 20:
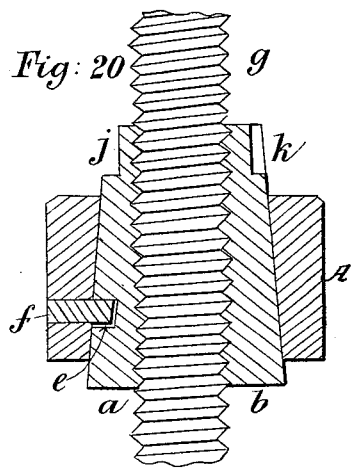
Figure 21:
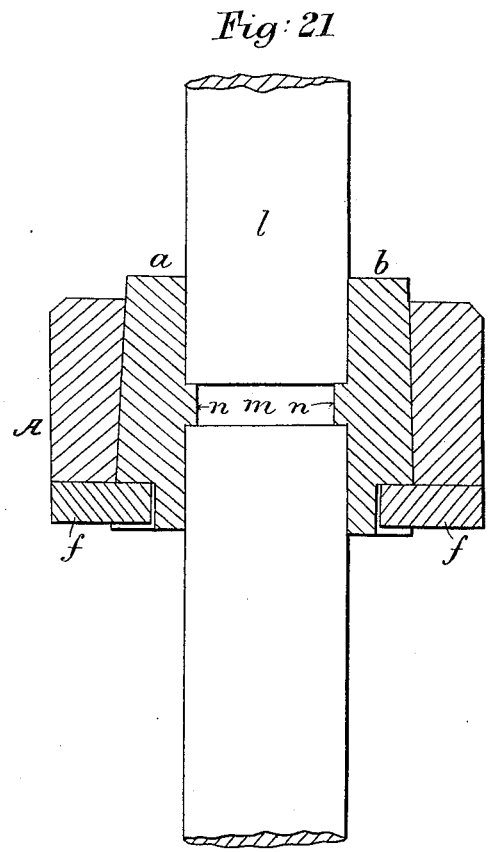

A side view of the two gripping-pieces is shown in Figure 1, and end views thereof are shown in Figs. 2 and 3. Fig. 4 is a view of the inner face of one of the gripping-pieces. Fig. 5 is a side view of the binding-collar. Figs. 6 and 7 are end views of the same, and Fig. 8 is a section thereof taken on the line A, Fig. 6. The said parts, placed and secured together so as to constitute a lock-nut, are shown applied to a screw in plan in Fig. 9, in side view in Fig. 10, and in section (taken on the line B, Fig. 9) in Fig. 11. Fig. 12 is an end view of a modification of the gripping-pieces; Fig. 13, a side view of the same; Fig. 14, a side view of the gripping-pieces in which the recesses are formed; Figs. 15 and 16 end views of the modified binding-collar; Fig. 17, a section of the same taken on the line C, Fig. 15; Fig. 18, an end view of the modified form of gripping-pieces and locking-collar applied to a screw; Fig. 19, a side view of the same; Fig. 20, a section on the line D, Fig. 18. Fig. 21 is a central section of another modification, and Fig. 22 a separate view of the inner face of one of the gripping-faces shown in Fig. 21.

In the drawings, the letters *a b* designate the gripping-pieces, which are formed of a circular metal tube longitudinally divided into two parts. These gripping-pieces are of cylindrical form internally and slightly tapering externally, the larger ends being the ends in which the recesses *e e* are formed, and they are provided with the internal screw thread, *c*, which corresponds with the screw-thread of the bolt or screw to which they are to be applied.

*d d* designate longitudinal recesses formed in the gripping-pieces *a b*, and *e e* recesses in the same at one end and at angles slightly obtuse to the said recesses *d*.

A indicates the binding-collar, which is internally tapered to correspond with the externally-tapered gripping-pieces *a b*.

*f f* are studs which project from the interior of the binding-collar A, and adapted to engage the gripping-pieces *a b* by means of the recesses *d e*.

Figure 9:
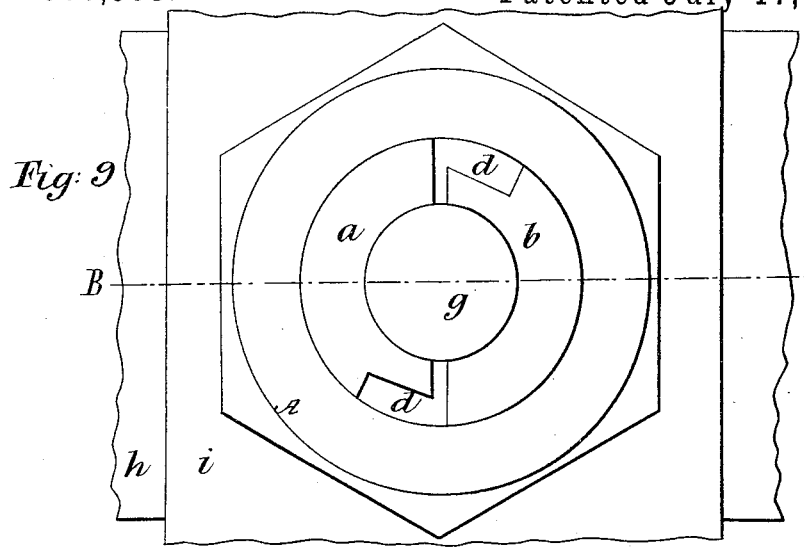
Figure 10:
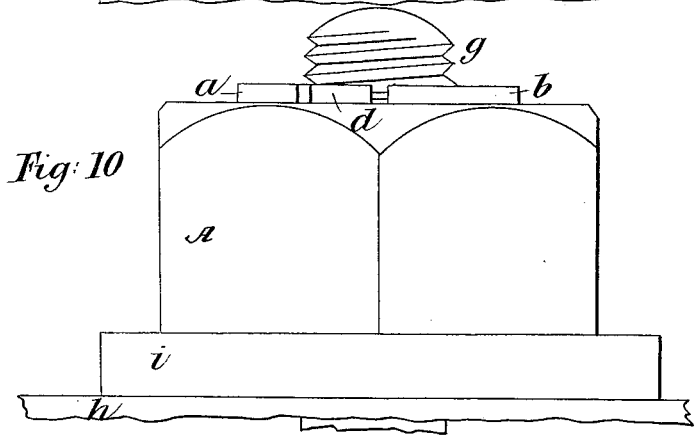

The method of applying the lock-nut to a screw is as follows: The gripping-pieces *a b* are placed on opposite sides of the screw, so that their screwed faces are engaged with the thread of the screw. The binding-collar is then passed over the gripping-pieces, the studs *f f* on the said collar passing down the longitudinal recesses *d d* to their ends. The said collar is then turned so as to cause the said studs to enter the recesses *e*, which are formed at one end of the gripping-pieces and at angles slightly obtuse to the recesses *d d e*, and to travel along them until the motion of the binding-collar is stopped by the wedging or jamming action produced by the bearing of the faces *f' f'* of the said studs against the inclined faces *e' e'* of the said recesses, the effect of which is to draw the binding-collar toward the larger ends of the gripping-pieces, the screwed faces of which are thus forced against and firmly held in close contact with the thread of the screw, as seen in Fig. 11, in which figure and in Figs. 9 and 10 the screw to which the nut is applied is marked *g*. The parts marked *h i* in the said Figs. 9, 10, and 11 represent, respectively, the part in which the screw *g* is fixed and the part which is required to be secured by the lock-nut.

The screwed tube from which the gripping-pieces are made may be divided into more than two parts.

In some cases I provide the binding-collar A with one stud $f$ only. In such cases only one of the longitudinal recesses $d$ and one of the inclined recesses $e$ are required, as shown in Figs. 12 to 20, inclusive.

In Figs. 15, 16, 17, 18, 19, and 20, A indicates the binding-collar internally tapered to fit the externally-tapered surfaces of the gripping-pieces $a\ b$, and having the single stud $f$.

In Figs. 12, 13, 14, 18, 19, and 20 each of the gripping-pieces $a\ b$, as in the constructions hereinbefore described, has a screw-thread, $c$; but only one of the pieces $a$ is furnished with a vertical groove, $d$, and a recess, $e$, extending at an angle slightly obtuse to the groove.

To provide for holding the gripping-pieces $a\ b$, and preventing them from turning while the binding-collar is being secured, in the construction last described I square the smallest ends of the said gripping-pieces, as at $j\ k$, Figs. 12, 13, 14, 18, 19, and 20, and make such squared ends of sufficient length to extend beyond the binding-collar and be held by a spanner or wrench while applying and securing the binding-collar to clamp the gripping-pieces on the bolt.

The method of applying the nut is the same as that already described with reference to the said Figs. 1 to 11, with the exception that when the said nut has no endwise bearing it is necessary to hold the gripping-pieces by means of a spanner, in order to prevent them from turning with the binding-collar while the latter is being secured.

Instead of forming the exterior of the binding-collar as shown in the accompanying drawings, it may be otherwise formed, or other provision may be made to admit of its being forcibly turned by means of a wrench or spanner or lever.

Lock-nuts constructed according to my invention are applicable for use in cases where nuts or stops are required to be fixed on a rod or shaft or spindle not bearing a screw-thread. In such case I form a recess or recesses, or an annular groove or annular grooves, in the rod or shaft $l$, or spindle, as indicated by $m$, Fig. 21, and corresponding projections or ribs on the inner faces of the gripping-pieces $a\ b$, as indicated by the letters $u\ u$ in Figs. 21 and 22, instead of a screw-thread; or I otherwise provide for the engagement of the said gripping pieces with the rod or shaft or spindle.

Figure 22:
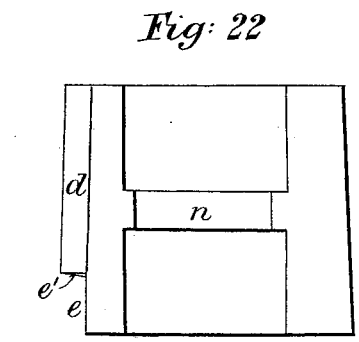

A lock-nut constructed according to my invention thus secured on a rod is illustrated in Figs. 21 and 22 of the accompanying drawings, in which the letter $l$ is the rod to which the nut is applied, $m$ is the recess in the said rod, and $n\ n$ are the ribs on the gripping-pieces which engage with the said recess $m$.

Having thus described my invention, I wish it to be understood that I do not limit myself to the precise details hereinbefore described, and illustrated in the accompanying drawings, as the same may be varied without departing from the nature of my invention; but

I claim—

1. A lock-nut consisting of a longitudinally-divided tube adapted to engage a screw, rod, or shaft, and provided with recesses $d\ d$ and $e\ e$, and a ring or collar provided with studs adapted to engage said recesses to bind the tube on the screw, rod, or shaft, substantially as described.

2. The combination of the two gripping-pieces adapted to engage a screw, rod, or shaft, and provided with the longitudinal recesses $d\ d$ and recesses $e\ e$, formed at an obtuse angle to said recesses, and a ring or collar provided with studs and adapted to engage said recesses $e\ e$, substantially as described.

3. A lock-nut consisting of a longitudinally-divided tube adapted to engage a screw, rod, or shaft, one portion of said tube provided with a recess, $d$, and a recess, $e$, and a ring or collar provided with a stud, $f$, adapted to engage said recess $e$ to bind the tube on the screw, rod, or shaft, substantially as described.

4. The combination of the rod $l$, having a recess, $m$, the gripping-pieces $a\ b$, having the ribs $n\ n$ and the recesses $d\ e$, and a locking ring or collar adapted to engage said recesses $e$, substantially as described.

RICHARD CLAY.

Witnesses:
WILLIAM THOMAS WHITEMAN,
ROLAND DAWSON BLOOMFIELD.